No. 623,382. Patented Apr. 18, 1899.
L. PRAY.
DEVICE FOR WATERING LIVE STOCK.
(Application filed May 27, 1898.)
(No Model.)
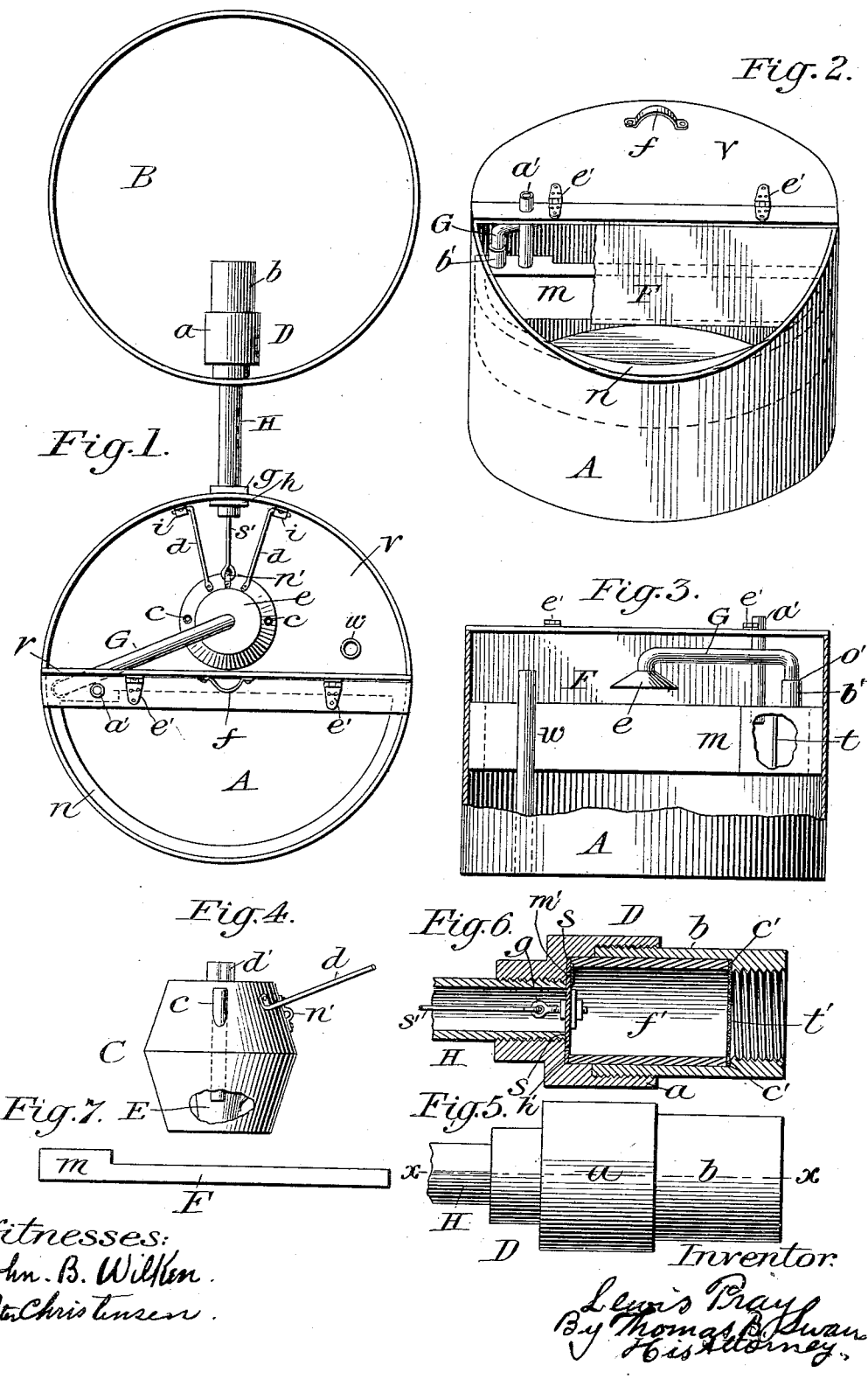

UNITED STATES PATENT OFFICE.

LEWIS PRAY, OF NOBLE, IOWA.

DEVICE FOR WATERING LIVE STOCK.

SPECIFICATION forming part of Letters Patent No. 623,382, dated April 18, 1899.

Application filed May 27, 1898. Serial No. 681,882. (No model.)

*To all whom it may concern:*

Be it known that I, LEWIS PRAY, a citizen of the United States of America, and a resident of the township of Noble, in the county of Cass and State of Iowa, have invented certain new and useful Improvements in Devices for Watering Live Stock, of which the following is a specification.

My invention relates to improvements in devices for watering live stock; and it consists in the peculiar construction and combination of the parts that will be more fully set forth hereinafter and particularly pointed out in the claims.

The objects of my invention are to provide a drinking vessel for live stock, which will be automatically supplied with water from a reservoir as it is consumed by the stock; also, to provide a float for controlling the valve of the supply-pipe of the drinking vessel that will operate in freezing weather, and also, to prevent ice from forming in freezing weather near the sides or casing of that part of the drinking vessel from which the stock drink.
I attain these objects by the device illustrated in the accompanying drawings, in which—

Figure 1 is a top or plan view of my device for watering live stock, having the cover of the drinking vessel open. Fig. 2 is a perspective view of the drinking vessel, having its cover closed and having parts of its sides and of the partition therein cut away to show the channels for conveying hot air. Fig. 3 is a rear view in elevation of the drinking vessel with the float removed and having a portion of its casing cut away to show the interior thereof and having a portion of the side of the hot-air channel in the partition therein cut away to show the partition in said channel. Fig. 4 is an enlarged detailed view of the float, having a portion of its side cut away to show the lamp therein. Fig. 5 is an enlarged detailed plan view of the valve chest or chamber. Fig. 6 is an enlarged detailed longitudinal sectional view of the valve chest or chamber, taken on line $xx$, Fig. 5, showing the valve and screen therein; and Fig. 7 is a bottom view of the partition in the drinking vessel.

Similar letters refer to similar parts throughout the several views.

A is a drinking vessel. The middle and rear portions thereof project above that part thereof from which the stock drink. That part of the vessel containing the float is provided with a cover $v$, which is hinged by the hinges $e'$ to the strip $v'$.

F is a partition extending across the vessel and is provided at its lower part with a hot-air channel $m$. The channel $m$ is enlarged at one end for the reception of the pipes $a'$ and $b'$ and is provided between the pipes $a'$ and $b'$, which open therein, with an air-tight partition $t$.

That part of the drinking vessel A in front of the partition F is provided with the hot-air channel $n$ at its top, which opens into and communicates with the channel $m$. The upper surface of the water in the drinking vessel bears against the channels $m$ and $n$.

C is the float, constructed hollow and open at its top. It is provided with the tubes $c$ for supplying the lamp with air, which extend downward below the flame of the lamp and open at their lower ends into the float and with the arms $d$ firmly secured thereto, which have their outer ends bent so as to loosely enter the perforated ears $i$, secured to the drinking vessel, thereby hinging the float to the vessel. The float is constructed tapering from its middle portion downward, thereby increasing its lifting power as the water rises around it.

E is a lamp which rests within the float and is provided with the chimney $d'$.

G is a swinging tubular arm which is provided at its outer end with the hood $e$. Its inner end loosely enters the pipe $b'$, forming the joint $o$. The hood when the lamp is in use rests just above the lamp-chimney, but when it is desired to remove the lamp from the float for any purpose the arm can be swung and the hood removed from over the lamp and float.

$w$ is a tubular screw-plug which passes through the bottom of the vessel A. It admits air into that portion of the vessel containing the float, and it can be removed when it is desired to let the water escape from the vessel for the purpose of cleaning it.

$f$ is the handle of the cover $v$.

B is a water-reservoir of ordinary construction.

H is a supply-pipe for the drinking vessel, having its ends threaded.

$g$ and $h$ are perforated threaded plates which screw onto the end of the supply-pipe H. The plate $g$ bears against the outer side of the vessel and the plate $h$ against its inner side.

D is a valve chest or chamber. Its casing is composed of two separable pieces $a$ and $b$, which screw together. The pieces $a$ and $b$ are each threaded on the inside of their outer ends, and the piece $a$ is screwed onto the end of the pipe H. The piece $b$ is provided within with the shoulder $c'$, against which the screen $t'$ rests, and the piece $a$ is provided within with the shoulder $s$, which forms the valve-seat.

$m'$ is a hinged valve provided with the eye-bolt $g'$.

$h'$ is a leather disk to which the valve is hinged in the ordinary manner, and is preferably constructed in the ordinary manner integral with the valve.

$f'$ is a removable tubular stay bearing at one end against the screen $t'$ and at the other end against the disk $h'$, thereby holding both the valve and screen in position.

$s'$ is a rod for operating the valve, which extends into the pipe H and is hinged at its outer end to the float by means of having its outer end bent so as to pass loosely through the perforated ear $n'$, secured to the float, and is hinged at its inner end to the valve by means of having its inner end bent so as to pass loosely through the eye in the bolt $g'$.

When the water-reservoir and drinking vessel are located within a few feet of each other, the valve-chest is placed within the reservoir, as shown in Fig. 1; but when they are not so located then the screen is removed from the valve-chamber and a pipe is screwed into the outer end of the piece $b$ and extended into the water-reservoir wherever it may be located.

The float, valve, and rod connecting the float and valve are so adjusted that when the drinking vessel is sufficiently full of water the valve will be closed and when not the valve will be opened.

In cold weather the lamp is kept burning within the float, and thereby heats the float and water surrounding it to such an extent that it prevents the water which comes in contact with the float from freezing in the coldest weather, and thus prevents the ice which may form upon the surface of the water within the vessel containing the float from adhering to the float and hindering its operation. The hot air which escapes from the float and lamp-chimney passes into the tubular arm G and thence down the pipe $b'$ and through the channel $n$ into the channel $m$, from which it escapes through the pipe $a'$, thereby keeping the surface of the water around its edge, contained in that part of the vessel from which the stock drink, sufficiently warm to prevent it from freezing in the coldest weather.

If the ice forms upon the surface of the water in that part of the vessel from which the stock drink, it is prevented by the hot air which circulates through the channels from adhering to the vessel and is thereby caused to float upon the surface of the water and can be readily pushed down into the water by the stock when they desire to drink.

The operation of my device is apparent, as it is evident that an upward movement of the float will close the valve and a downward movement open it, and that when the water is being consumed by the stock the float will fall and open the valve, and that when the stock cease to consume the water it will rise in the drinking vessel and cause the float to move upward until the valve is closed, and further evident that when the lamp is burning the hot air will circulate through the channels, as before explained herein.

Having described my invention, what I claim as new, and desire to secure by Letters Patent, is—

1. The combination of the reservoir, the drinking vessel having channels for the conveyance of hot air, the heated float hinged to the vessel, the means for conveying the hot air from the heated float to the channels, the supply-pipe, the valve connected with supply-pipe, and the rod connecting the valve with the hinged float, substantially as described.

2. A drinking vessel for live stock having, within its side walls and forming a part thereof, channels adapted for the conveyance of hot air therein, substantially as described.

3. A drinking vessel for live stock provided with hot-air channels located within its side walls and forming a part thereof, and with means for heating the air and conducting it to and from the channels, substantially as described.

4. The combination of the drinking vessel, the hot-air channels located within the side walls of the vessel and forming a part of the walls, the air-pipes leading into and from the channels, and the means for heating the air which circulates through the channels, substantially as described.

5. The combination of the drinking vessel, the hot-air channels located within the side walls of the vessel and forming a part of the walls, the tubular swinging arm communicating with, and extending from the channels, and the lamp located under the outer end of the tubular arm, substantially as described.

6. A valve-chest having a case composed of two separable parts, and provided with a removable stay for holding the valve in position, substantially as described.

7. The combination of the valve-chest case composed of two separable pieces threaded at their ends, the tubular removable stay for holding the valve in position, and the valve, substantially as described.

8. The combination of the valve-chest case composed of two separable pieces, the tubular removable stay for holding the valve in position, the valve, and the means for operating the valve, substantially as described.

Signed by me at the city of Atlantic, in the county of Cass and State of Iowa, this 23d day of May, A. D. 1898.

LEWIS PRAY.

Witnesses:
   CHARLES T. WONONS,
   B. L. GARRETSON.